United States Patent
High et al.

(10) Patent No.: US 10,360,528 B2
(45) Date of Patent: Jul. 23, 2019

(54) PRODUCT DELIVERY UNLOADING ASSISTANCE SYSTEMS AND METHODS

(71) Applicant: Walmart Apollo, LLC, Bentonville, AR (US)

(72) Inventors: Donald R. High, Noel, MO (US); David C. Winkle, Bella Vista, AR (US); Michael D. Atchley, Springdale, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 299 days.

(21) Appl. No.: 15/342,716

(22) Filed: Nov. 3, 2016

(65) Prior Publication Data

US 2017/0132561 A1    May 11, 2017

Related U.S. Application Data

(60) Provisional application No. 62/252,226, filed on Nov. 6, 2015.

(51) Int. Cl.
*G06F 3/00*        (2006.01)
*G06Q 10/08*      (2012.01)
(Continued)

(52) U.S. Cl.
CPC ........... *G06Q 10/0832* (2013.01); *G06T 7/73* (2017.01); *H04N 7/18* (2013.01); *H04N 7/181* (2013.01);
(Continued)

(58) Field of Classification Search
CPC ...... G06Q 10/0832; H04N 7/181; H04N 7/18; H04N 5/23293; G06T 7/0044; G06T 7/20;
(Continued)

(56) References Cited

U.S. PATENT DOCUMENTS 7,596,242 B2    9/2009  Breed
8,232,990 B2    7/2012  King
(Continued)

OTHER PUBLICATIONS

Sick Sensor Intelligence; "Efficient Solutions for Warehouse and Distribution"; www.sick.com; May 2009; pp. 1-40.

*Primary Examiner* — Howard D Brown, Jr.
(74) *Attorney, Agent, or Firm* — Fitch, Even, Tabin & Flannery LLP

(57) ABSTRACT

In some embodiments, apparatuses, systems and methods are provided herein useful to assist in unloading products. Some embodiments provide a product unloading assistance system, comprising: a control circuit; a graphical display; a camera; and a memory with the control circuit performing the steps of: receive an image from the camera comprising at least a portion of a product delivery vehicle and one or more reference points on the delivery vehicle; obtain an identifier of a load in the delivery vehicle to be unloaded; and cause the graphical display to display, in accordance with an orientation of the camera relative to the delivery vehicle based on the one or more reference points, 3D graphical representations of multiple different packaged products as loaded into the delivery vehicle and their orientation relative to each other as they are positioned within the delivery vehicle.

19 Claims, 4 Drawing Sheets

(51) Int. Cl.
*H04N 7/18* (2006.01)
*G06T 7/73* (2017.01)

(52) U.S. Cl.
CPC ............... *G06T 2207/30204* (2013.01); *G06T 2207/30244* (2013.01)

(58) Field of Classification Search
CPC . G06T 2207/30244; G06T 2207/30252; G06T 2200/04; G06T 2200/24
See application file for complete search history.

(56) References Cited

U.S. PATENT DOCUMENTS

| | | | |
|---|---|---|---|
| 8,443,301 B1 | 5/2013 | Easterly | |
| 8,570,343 B2 | 10/2013 | Halstead | |
| 2004/0143602 A1* | 7/2004 | Ruiz | G08B 13/122 |
| 2012/0194679 A1* | 8/2012 | Nehowig | G06F 1/1626 |
| | | | 348/148 |
| 2012/0283868 A1* | 11/2012 | Rutt | G06Q 10/043 |
| | | | 700/217 |
| 2014/0136153 A1 | 5/2014 | Chen | |
| 2014/0205403 A1 | 7/2014 | Criswell | |

* cited by examiner

PRODUCT DELIVERY UNLOADING ASSISTANCE SYSTEMS AND METHODS

CROSS-REFERENCE TO RELATED APPLICATION

This application claims the benefit of U.S. Provisional Application No. 62/252,226, filed Nov. 6, 2015, which is incorporated herein by reference in its entirety.

TECHNICAL FIELD

This invention relates generally to unloading product deliveries at shopping facilities.

BACKGROUND

In modern retail environments, there is a need to improve the customer experience and/or convenience for the customer. In a shopping environment, it can be important that product inventory is readily available to customers. Further, the customer experience at the shopping facility can have significant effects on current sales.

Providing a pleasant or improved customer experience can lead to customer satisfaction and repeat returns to the shopping location. There are many ways to improve customer experience. For example, ready access to products can lead to increased customer visits and customer loyalty. The shopping facility can affect customer experience based in part on finding products of interest, access to a shopping facility, and/or congestion within the shopping facility. Accordingly, it can be advantageous to improve the customers' shopping experience.

BRIEF DESCRIPTION OF THE DRAWINGS

Disclosed herein are embodiments of systems, apparatuses and methods pertaining assisting the unloading of a delivery vehicle. This description includes drawings, wherein.

Figure 1:
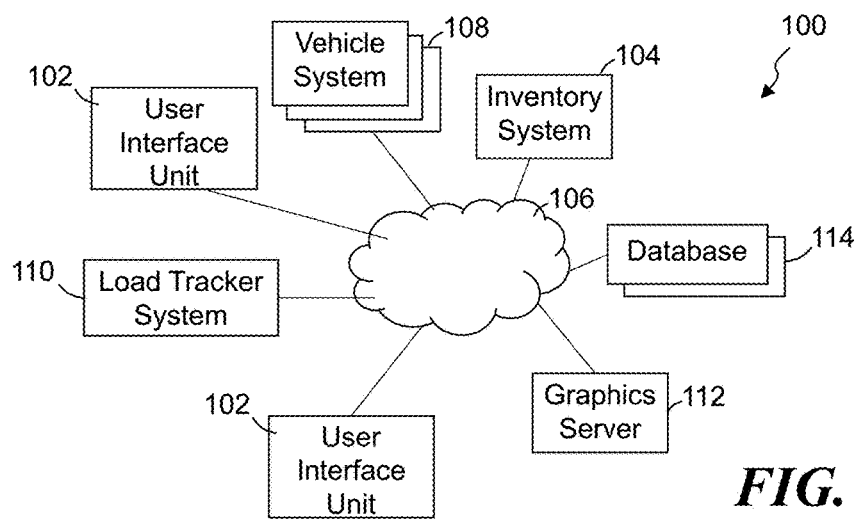
FIG. 1 illustrates a simplified block diagram of a product unloading assistance system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein that aid workers at a shopping facility in unloading products from delivery vehicles at a shopping facility. In some embodiments, a product unloading assistance system is provided that includes a control circuit, a graphical display that is communicationally coupled with the control circuit and configured to display three-dimensional (3D) graphical representations, a camera that is communicationally coupled with the control circuit, and a memory coupled to the control circuit. The memory stores computer instructions that when executed by the control circuit cause the control circuit to: receive an image from the camera that comprises at least a portion of a product delivery vehicle to be unloaded at a shopping facility, and one or more reference points on the delivery vehicle. Typically, the one or more reference points are readily identifiable from the image. The control circuit further obtains an identifier of a load being delivered to the shopping facility by the delivery vehicle, and cause the graphical display to display, in accordance with an orientation of the camera relative to the delivery vehicle based on the one or more reference points, 3D graphical representations of multiple different packaged products as loaded into the delivery vehicle and their orientation relative to each other. Often, the control circuit receives a tracked loading log of the delivery vehicle that was compiled during the loading of the multiple different packaged products as they were positioned within the delivery vehicle during the loading.

FIG. 1 illustrates a simplified block diagram of a product unloading assistance system 100, in accordance with some embodiments. The product unload assistance system includes one or more user interface units 102 or other such graphical display devices, and an inventory system 104 communicationally coupled via a communications network 106. The unload assistance system may further include and/or communicate with delivery vehicle systems 108 that can provide relevant information about the delivery vehicle, load, products in the load and being delivered by the delivery vehicle and other such information. Further, the unload assistance system 100 may include one or more load tracker systems 110, one or more graphics servers 112 and databases 114 that can communicate with one or more components over the communication network 106. In some applications, the product unload assistance system 100 may be part of a shopping facility system, with a central computer system that communicates with and/or implements one or more of the inventory system 104, graphics server 112, database 114, and/or other components of the system. Further, the central computer system may provide the communication over the distributed network 106 with one or more other components (e.g., the databased, inventory system graphics server, and the like).

The user interface unit 102 is typically a portable device that includes a graphics display and/or upon which graphics can be displayed to display information to a worker using the unit. For example, the user interface can be, but is not limited to, smart phones, tablets, optical head-mounted display systems, smart watch systems, shopping facility specific wireless communication devices, scanning devices, and other such consumer electronic user devices. Further, the user interface unit can be positioned and/or held relative to a delivery vehicle to capture with a camera of the user interface unit one or more images and/or video (generally referred to below as an image) of a delivery vehicle. An orientation of the camera of the user interface unit relative to the delivery vehicle can be determined. Based on this orientation, a graphical representation of products in a load being delivered by the delivery vehicle can be displayed. Typically, the user interface unit 102 communicates with the inventory system 104 and/or the vehicle system 108 to obtain product information about the products in the load.

The inventory system 104 can maintain inventory information regarding products in the load being delivered by the delivery vehicle and/or obtains inventory information from the vehicle system. Further, the inventory system can be local at the shopping facility where the load is being unloaded, can be remote from the shopping facility, or partially be implemented local at the shopping facility and partially implemented remote from the shopping facility (e.g., through one or more remote inventory servers and/or databases 114). Typically, the inventory system maintains and/or has access to inventory information that can be provided to the user interface units 102. The user interface units can allow workers at the shopping facility to access relevant product information and/or utilize the product information in displaying representations of the products in the load.

The load tracker system 110 can track products as they are loaded onto delivery vehicles. In some embodiments, the load tracker system generates and/or maintains a tracked loading log of delivery vehicles that are compiled prior to and/or during the loading of the multiple different packaged products into respective delivery vehicles. Further, in some implementations, the tracked loading log further tracks an order in which different product packages are placed into the delivery vehicle, and often an orientation of each product relative to the delivery vehicle and relative to other products within the delivery vehicle. In some implementations, the tracked loading log notifies loading workers how to load packaged products into the delivery vehicle. For example, 3D modeling of the packaged products and the delivery vehicle can be used to determine a loading pattern of the packaged products that are to be loaded into the delivery vehicle intended to be delivered to one or more shopping facilities. Additionally or alternatively, the delivery vehicle can be identified (e.g., scanning a bar code of the delivery vehicle, RFID, obtaining a delivery vehicle number, etc.) and images and/or video can be captured as products are loaded onto the delivery vehicle. Product identifiers can be obtained (e.g., scanning bar codes, RFID, etc.) for products as they are loaded onto the delivery vehicle along with corresponding timing. The captured images can be processed in relation to the identified products and the timing of the captured image relative to the product identification, and used to generated the tracked loading log, confirm accurate placement in accordance with and/or supplement a previously generated tracked loading log. For example, when a packaged product is placed in the delivery vehicle video is captured, and video analytics can be performed on the video to identify one or more reference points of the packaged product and/or delivery vehicle to identify a location of packaged product within the trailer. The 3D modeling and/or dimensions of the packaged product and/or products previously and/or subsequently placed in the delivery vehicle can additionally be used to enhance accuracy.

Additionally or alternatively, the product orientation information may be entered by a worker loading the delivery vehicle, obtained from one or more scanning devices that scan one or more identifiers of product packages to accurately identify products as they are loaded, determined based on image processing of pictures and/or video captured over time of an interior of the delivery vehicle as the delivery vehicle is loaded, and other such relevant information. Using this information, the load tracker system can generate the tracked loading log that, in some implementations, includes a listing of each product of the load, and for each product of the load the product's orientation within the delivery vehicle, and the product's orientation relative to one or more other products within the load. The orientation information may define, for example, a relative orientation of a corner or multiple corners of a package within a defined interior volume of the delivery vehicle. As a specific example, X, Y and Z coordinates of a particular corner (e.g., positioned closest to a predefined point or location of the delivery vehicle), multiple corners, edge, etc. relative to the predefined point or location of the delivery vehicle, which may be defined as an origin point of the three-dimensional coordinates of at least an interior of the delivery vehicle. Because of the reference points and known locations of the packaged products relative to the delivery vehicle, one or more virtual images can be generated of the packaged products within the delivery vehicle with precise knowledge of the location of each product relative to the time the products were loaded.

Some embodiments include one or more graphics servers 112 that are remote from the user interface units 102. The graphics servers 112 can store and/or generate graphics data and/or graphical representations that can be communicated over the communication network 106 to the user interface units to be displayed by the user interface units. The graphics servers can be implemented by one or more server systems that typically have significantly greater graphics processing capabilities that the portable user interface units. Further, the graphics server may be implemented through one or more distributed servers and/or processors that are communicationally coupled over a communication network 106 (e.g., WAN, LAN, Internet, etc.). As such, image processing, graphics rendering, and/or other such processing may be performed remote from the user interface units to improve response speed and/or reduce processing requirements on the user interface units. Further, in some applications the graphics server may be part of and/or coupled with a server and/or system. For example, in some embodiments, the graphics server 112 may be part of a remote product distribution server that in part tracks the distribution of products to one or more shopping facilities, customer locations, and/or other sites.

In some embodiments, the user interface unit 102, inventory system 104 and/or graphics server 112 can access or acquire (e.g., from a database 114) dimensions information for each of the packaged products and/or product packaging in combination with the orientation information to generate a 3D mapping of the packaged products within the load. Additionally or alternatively, some embodiments may have 3D graphical models of each packaged product and corresponding dimensions that can be used in mapping. The 3D mapping can then be used by the user interface unit 102, and/or graphics server 112 to generate a three-dimensional graphical representation of the products within the delivery vehicle. Further, the user interface unit typically includes a camera that can capture one or more exterior and/or interior images of the delivery vehicle. Image processing can be performed by the user interface unit and/or the graphics server 112 to determine an orientation of the camera relative to the delivery vehicle. Based on the determined orientation and mapping, 3D graphical representation of the packaged products can be generated of the packaged products of the load that illustrates, as if some or all of the delivery vehicle were removed, the multiple different packaged products as loaded into the delivery vehicle and their orientation relative to each other as they are positioned within the delivery vehicle. Again, the products are illustrated based on the orientation of the camera such that when displayed on the user interface unit, the product packages of the load are displayed consistent with an orientation of a worker holding the user interface unit. As such, the 3D graphical representation when displayed on the user interface unit appears to provide a worker with the ability to view through the sides or walls of the delivery vehicle and see the product packages within the delivery vehicle as oriented upon loading of the delivery vehicle.

Figure 2:
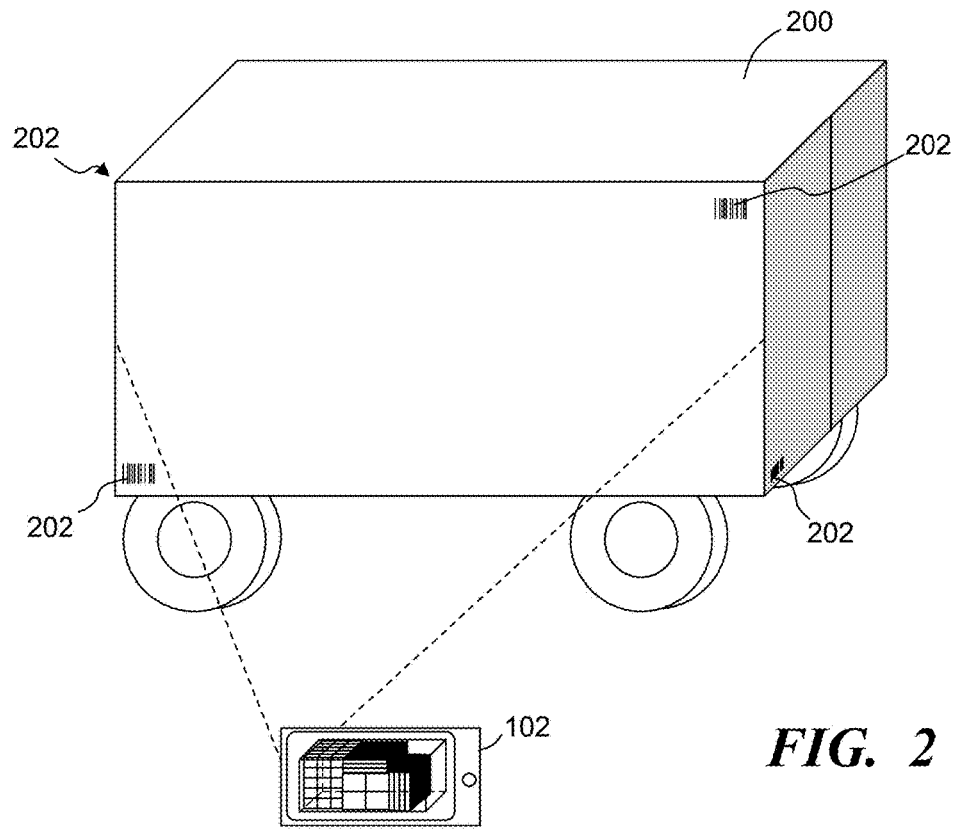
FIG. 2 illustrates a simplified block diagram side view of at least a portion of an exemplary delivery vehicle, in accordance with some embodiments.

FIG. 2 illustrates a simplified block diagram side view of at least a portion of an exemplary delivery vehicle 200, in accordance with some embodiments, with a user interface unit 102 positioned with a camera (not shown) directed at the delivery vehicle. The delivery vehicle 200 can be a truck, a trailer that is temporarily cooperated with a truck or the like, a van, or other such delivery vehicle capable of receiving and transporting packaged products to shopping facilities. One or more products, and typically large quantities of packaged products are loaded into the delivery vehicle 200. As the products are loaded into the delivery vehicle, a tracked loading log of the load can be generated and maintained that identifies the products loaded and their relative orientation within the delivery vehicle and/or relative to one or more other products of the load loaded into the delivery vehicle.

Figure 3:
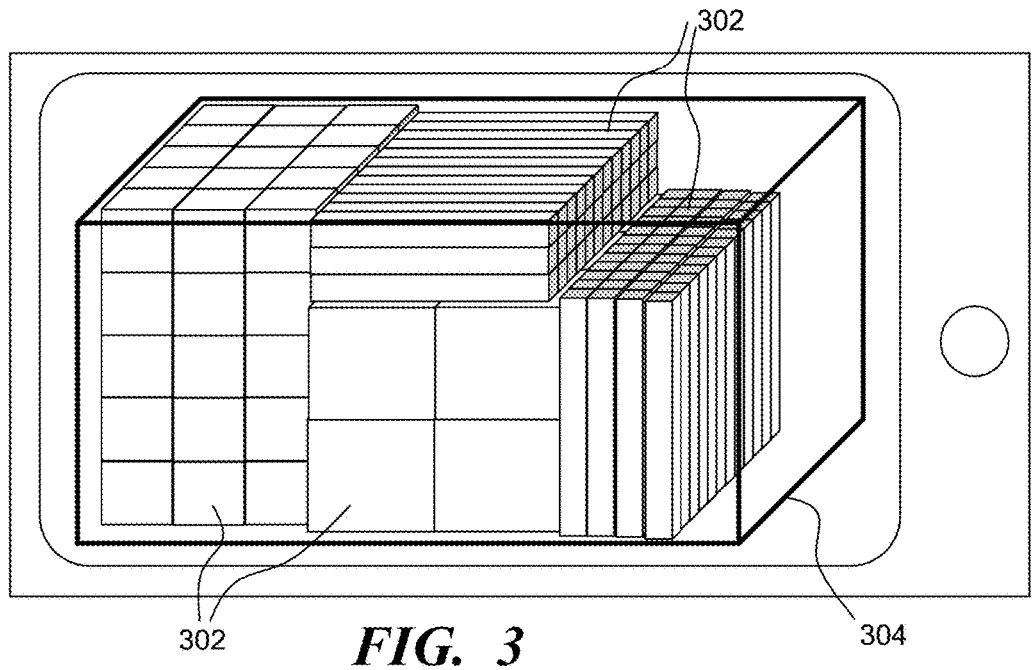
FIG. 3 illustrates a simplified block diagram of an exemplary three-dimensional (3D) graphical representation of the delivery vehicle of FIG. 2 showing the representations of the packaged products being displayed on a user interface unit, in accordance with some embodiments.

FIG. 3 illustrates a simplified block diagram of an exemplary 3D graphical representation of the delivery vehicle of FIG. 2 showing the representations of the packaged products 302 being displayed on a user interface unit 102, in accordance with some embodiments. The 3D graphical representation three-dimensionally shows at least the packaged products 302 and their orientation relative to at least each other. Typically, the 3D graphical representation further shows the packaged product orientation within and/or relative to the delivery vehicle. In some instances, some of the exterior of the delivery vehicle may be shown as reference. In other instances, an outline 304 of some or all of the delivery vehicle 200 may be displayed, which can provide a visual orientation of the packaged products 302 relative to the delivery vehicle. As such, the system can filter out some or all of the delivery vehicle to display the relevant packaged products. This representation can be displayed as though the worker could see through the sides of the delivery vehicle and/or through product packages in the delivery vehicle. In some applications, this 3D graphical representation provides a simulated and/or virtual x-ray vision into the delivery vehicle using image and/or video analytics and 3D modeling. Again, the location of product packages within the delivery vehicle can be determined based on the tracked loading log, and in some instances known dimensions and/or 3D modeling of the packaged products.

Referring to FIG. 2-3, in some implementations, the delivery vehicle 200 can include one or more predefined reference points 202 and/or markers on the exterior and/or interior of the delivery vehicle. These reference points 202 may be structural components of the delivery vehicle (one or more predefined corners of the delivery vehicle, a location of one or more handles and/or hinges of doors, a wheel, and the like), reference points affixed to the delivery vehicle, one or more distinct features of decoration and/or labeling of the delivery vehicle, other such distinct features, or a combination of two or more of such features. Typically, one or more of the reference points do not change position over time. Additionally or alternatively, reference points can be selected during loading and/or overtime selected (e.g., after a new painting and/or markings are affixed). In some instances, one or more reference points 202 can be affixed at precise locations on the delivery vehicle, and/or a precise location of where the reference points are on the delivery can be determine (e.g., through physical measurements, image process with known dimensions of the delivery vehicle, and the like). For example, in some implementations one or more bar code reference points can be painted and/or otherwise affixed to the delivery vehicle. Further, the bar code reference points may provide additional information about the delivery vehicle, such as but not limited to a vehicle identifier, dimensions information, a relative location of the bar code reference point on the delivery vehicle, and/or other such information. The physical location of the references points are known and/or can be determined relative to the delivery vehicle. In some instances, the vehicle identifier can be used to obtain the correct and current tracked loading log. The dimensions of the delivery vehicle and/or 3D modeling of the delivery vehicle allow for the accurate rendering of the products within the delivery vehicle. This can take into consideration thickness of the walls, areas where products cannot be placed, and other such aspects of the delivery vehicle.

Figure 4:
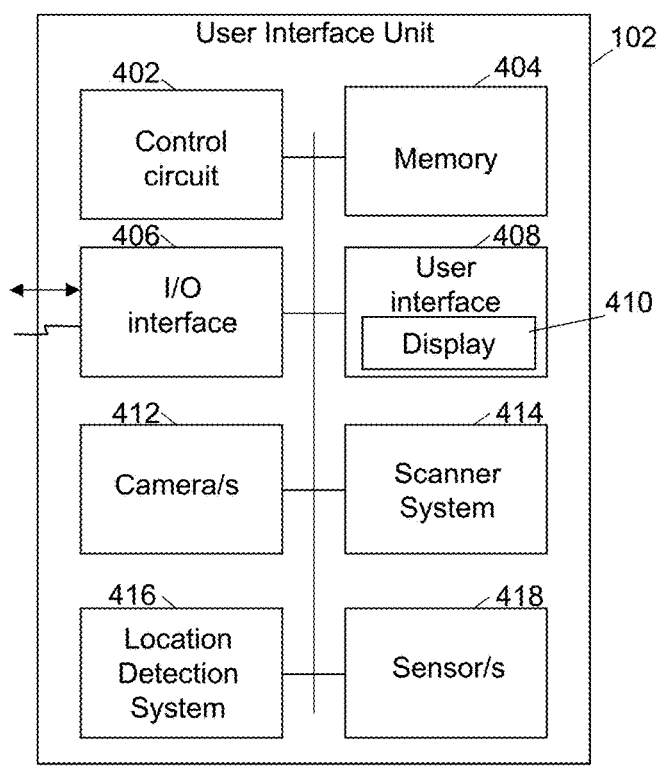
FIG. 4 illustrates a simplified block diagram of an exemplary user interface unit, in accordance with some embodiments.

FIG. 4 illustrates a simplified block diagram of an exemplary user interface unit (UIU) 102, in accordance with some embodiments. The user interface unit includes one or more control circuits 402, memory 404, input/output (I/O) interfaces and/or devices 406, and user interfaces 408. In some implementations, the user interface unit further includes one or more cameras 412. Additionally, in some applications, the user interface unit may include one or more scanner systems 414 and/or code readers, location detection systems 416, sensors 418, and/or other such systems.

The control circuit 402 typically comprises one or more processors and/or microprocessors. In some embodiments, the control circuit may include and/or couple with one or more graphics processors configured to generate 3D graphical representations of the product packages of a load in a delivery vehicle. The memory 404 stores the operational code or set of instructions that is executed by the control circuit 402 and/or processor to implement the functionality of the user interface unit 102. In some embodiments, the memory 404 may also store some or all of particular data that may be needed to display the 3D representations, capture images and/or video, and make any of the associations, determinations, measurements and/or communications described herein. Such data may be pre-stored in the memory, received from an external source (e.g., inventory system 104, graphics server 112, load tracker system 110, etc.), be determined, and/or communicated to the user interface unit. It is understood that the control circuit 402 and/or processor may be implemented as one or more processor devices as are well known in the art. Similarly, the memory 404 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 404 is shown as internal to the user interface unit 102; however, the memory 404 can be internal, external or a combination of internal and external memory. Additionally, the user interface unit typically includes a power supply (not shown) that is typically rechargeable, and/or it may receive power from an external source. While FIG. 4 illustrates the various components being coupled together via a bus, it is understood that the various components may actually be coupled to the control circuit 402 and/or one or more other components directly.

Generally, the control circuit 402 and/or electronic components of the user interface unit 102 can comprise fixed-purpose hard-wired platforms or can comprise a partially or wholly programmable platform. These architectural options are well known and understood in the art and require no further description here. The user interface unit and/or control circuit can be configured (for example, by using corresponding programming as will be well understood by those skilled in the art) to carry out one or more of the steps, actions, and/or functions described herein. In some implementations, the control circuit 402 and the memory 404 may be integrated together, such as in a microcontroller, application specification integrated circuit, field programmable gate array or other such device, or may be separate devices coupled together.

The I/O interface 406 allows wired and/or wireless communication coupling of the user interface unit 102 to external components, such as the inventory system 104, graphics server 112, load tracker system 110, database 114, and other such devices or systems. Typically, the I/O interface 406 provides at least wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitter, receiver, transceiver, etc.

The user interface 408 may be used for user input and/or output display. For example, the user interface 408 may include any known input devices, such one or more buttons, knobs, selectors, switches, keys, touch input surfaces, audio input, and/or displays, etc. Additionally, the user interface 408 include one or more output display devices, such as lights, visual indicators, display screens 410, etc. to convey information to a user, including the 3D graphical representation of the packaged products and their orientation of a load, information, dimensions, product unload priorities, identifier information, temperature requirements, location within an unloading area, back storage area and/or sales floor where a product is to be placed upon unloading, communication information (e.g., text messages, emails, etc.), status information, mapping information, operating status information, notifications, errors, conditions, and/or other such information. Similarly, the user interface 408 in some embodiments may include audio systems that can receive audio commands or requests verbally issued by a worker, and/or output audio content, alerts and the like.

The one or more cameras 412 are configured to capture images and/or video. In operation, a worker and orient the user interface unit with a camera directed at the delivery vehicle 200, and activate the camera to capture one or more images and/or video. In some embodiments, the user interface unit may include one or more additional cameras, such as a second camera that can capture one or more worker images and/or video of the worker while capturing images and/or video of the delivery vehicle. The worker images can additionally be processed to determine an orientation of the worker and/or the worker's eyes relative to the delivery vehicle and/or the display 410 of the user interface unit. This additional orientation can be utilized in generated the 3D graphical representations of the packages products to be displayed consistent with an orientation of the user relative to the delivery vehicle and/or relative to the user interface unit.

In some embodiments, the user interface unit 102 may include one or more scanner systems 414 configured to detect and/or read machine readable codes on product packaging, delivery vehicles, load logs, and the like. The scanner systems 414 can be substantially any relevant system capable of scanning a machine readable code, detecting a machine readable code, capturing an image of an identifier and obtaining product identifier information based on the identifier in the image, and other such scanning systems. For example, the scanner system may be an optical bar code reader that obtains an identifier from a bar code and determine and identifier of the product, a camera that captures an image of a 2-dimensional code, and the like. The scanner system 414 can be configured to extract code information from the one or more machine readable codes that are read and/or detected, and/or the control circuit 402 may extract identifying information. Alternatively or additionally, the code information may be communicated to the inventory system 104 or other source that can extract and/or determine relevant identifier information. In some instances, a shopping facility worker activates the scanner system 414 while being directed at a machine readable code (e.g., activating a button, activating a camera, activated through a software application (APP) stored on and implemented though a user interface unit, etc.).

In some embodiments, the user interface unit 102 may receive location and/or movement information and/or include a location detection system 416 that is configured to determine a current location of the user interface unit and/or tracks movements of the user interface unit. The location detection system can provide relevant information in determining an orientation of the user interface unit and/or the camera relative to the delivery vehicle 200. In some instances, the location information may be utilized by the control circuit 402 and/or the graphics server 112 in generating the 3D graphical representations of products within the delivery vehicle. In some embodiments, the location detection system may include a machine readable location code reader, global positioning satellite (GPS) detector, Wi-Fi signal triangulation and/or evaluation, cellular tower triangulation, accelerometers, gyroscopes, compass, light identifier detection system, and/or other such location detection functionality. Further, some embodiments utilize video and/or additional images captured by the camera 412 to determine and/or track movement (e.g., image and/or video processing to determine changes in position based on comparisons with one or more other captured images and/or frames in a video.

The user interface unit 102 may, in some implementations, further include one or more sensors 418. These sensors, at least in part, can be used in determining location of the user interface unit, tracking movement of the user interface unit, determining and/or tracking an orientation of the user interface unit, and the like. For example, in some embodiments, the user interface unit may include a distance measurement senor (e.g., laser distance measurement system) that can determine one or more distances between the user interface unit and one or more objects (e.g., the delivery vehicle 200). The sensor data can continue to be obtained to detect changes over time (e.g., changes in distance between the user interface unit and one or more other objects), which can be used to track movement between the user interface unit and the delivery vehicle. Accordingly, the control circuit 402, graphics processor of the user interface unit and/or the graphics server 112 can utilize location and/or orientation information to determine a relative orientation of the user interface unit and/or the camera of the user interface unit relative to the delivery vehicle. The orientation and/or location information can include, but is not limited to, sensed distance information, determined distances (e.g., based on image processing), determined angular relationships (e.g., based on size and/or orientation of reference points), tracked movements, determined movements (e.g., based on image and/or video processing), and the like.

Referring to FIGS. 1 and 2, the product unloading assistance system 100 provides interactive graphical representations to a worker of products loaded in a delivery vehicle 200, which in part can assist the worker or workers in unloading the delivery vehicle. In some implementations the control circuit 402 is communicationally coupled with the graphical display 410 that is configured to display three-dimensional (3D) graphical representations. The control circuit is further communicationally coupled with the one or more cameras 412, and in some embodiments receives an image from the camera comprising at least a portion of a product delivery vehicle 200 to be unloaded. The image often further includes one or more reference points 202 on the delivery vehicle. As introduced above, the one or more reference points are readily identifiable from the image and distinguishable from other aspects and/or parts of the delivery vehicle. For example, one or more predefined markers, bar codes, or the like may be affixed to the exterior of the delivery vehicle at known locations. The locations may be predefined or may be determined after the marker or other reference point is affixed to the delivery vehicle. The location of each of the reference points is further known relative to dimensions of the delivery vehicle. In some instances, one or more of the reference points 202 may include identifier information of the delivery vehicle and/or a combination of the reference points and/or their location relative to each other and/or their location on the delivery vehicle may provide identifier information of the delivery vehicle.

Some embodiments utilize the location and/or orientation of the reference points to determine an orientation of the user interface unit 102 and/or camera 412 relative to the delivery vehicle. For example, the control circuit may perform or cause an image processor of the user interface unit to perform image processing of one or more images and/or frames of a video to identify one or more of the reference points and determine a relative orientation of the user interface unit relative to the delivery vehicle. Additionally, in some implementations, motion information (e.g., from inertial sensors, gyroscopes, etc.) can further be used to determine orientation and/or track movement that can be used to tracking the orientation of the user interface unit relative to the delivery vehicle. Based on the orientation and/or movement, the 3D graphical representation can be generated and/or retrieved that corresponds to the orientation.

The control circuit 402 further obtains an identifier of a load in the delivery vehicle to be unloaded. The load identifier can be obtained from scanning a load log identifier, an inventory sheet identifier, a worker entering in a load identifier, receiving the load identifier from an inventory system in response to identifying a delivery vehicle, and/or other such sources or combination of such sources. The load identifier can be used to identify packaged product 302 within the delivery vehicle and/or obtain the tracked loading log corresponding to the delivery vehicle and the load in the delivery vehicle.

Further, the control circuit causes the graphical display 410 to display, in accordance with an orientation of a camera 412 of the user interface unit 102 relative to the delivery vehicle based on the one or more reference points 202, 3D graphical representations of multiple different packaged products 302 as loaded into the delivery vehicle 200 and their orientation relative to each other as they are positioned within the delivery vehicle based on the tracked loading log of the delivery vehicle. Again, the tracked loading log may be compiled at least in part during the loading of the multiple different packaged products into the delivery vehicle. In some embodiments, the control circuit generates, through one or more graphics processors, some or all of the 3D graphical representations based on the determined orientation of the camera 412 relative to the delivery vehicle. In other instances, some or all of the 3D graphical representations may be provided by a remote source, such as the graphics server 112. As such, the orientation information can be communicated to the graphics server that can generate the 3D graphics representation of the product packages, and/or obtains one or more previously generated 3D graphics representations that correspond with or are within a threshold variation of the orientation of the user interface relative to the delivery vehicle. For example, typical vertical orientations may be determined (e.g., based on average use, based on average height of workers and the relative location workers typically hold the user interface unit when orienting the user interface, and the like), and one or more 3D graphical representations may be made for different vertical orientations and at defined distance intervals around the delivery vehicle. Further, in some instances, the distance intervals may vary around the delivery vehicle (e.g., it may be determined that workers more often are orientated toward a rear of the delivery vehicle and/or proximate doors of the delivery vehicle, and as such the distance intervals may be reduced around those areas where workers are more often positioned when attempting to view the 3D graphical representations.

Some embodiments are further configured to track movements of the user interface unit and modify and/or generate new 3D graphical representations of the packaged products based on the movement of the user interface unit. As such, the displayed view can be modified to track movements of the user interface unit. In some implementations, the control circuit 402 tracks the movements of at least the camera 412 of the user interface unit relative to delivery vehicle. This movement can be detected based on image processing and detecting the change of orientation between images and/or frames, provided by the location detection system 416 and/or sensor data from one or more sensors 418 (e.g., inertial sensor data, GPS coordinate information, distance measurements, etc.). Based on the change in orientation, the control circuit can cause updates of the 3D graphical representations of multiple different packaged products such that the updated displayed 3D graphical representations of the different packaged products continues to be consistent with the orientation of the user interface unit 102, camera 412 and/or worker relative to the delivery vehicle as the user interface unit, camera and/or worker is moved.

Similarly, the unloading of the product packages can be tracked over time and the 3D graphical representations can be modified based on the status of the unloading, the products that have been removed and the products remaining the delivery vehicle. In some embodiments, representations of packaged products are removed from the 3D graphical representations in response to determining that a product has been removed from delivery vehicle. This can be determined based on a product being scanned and identified as it is being removed from the delivery vehicle, a confirmation that the product was removed (e.g., a customer signing for the delivery of the packaged product, a worker scanning a product as part of a sorting or picking process at a shopping facility, image processing that can confirm a package is removed, image processing that detects remaining packages in the delivery vehicle, and/or other such tracking methods). Accordingly, in some applications the control circuit can receive an identification of one or more packaged products 302 that are indicated as removed from the delivery vehicle 200. The one or more 3D graphical representations of the packaged products are modified based on the identification of which products are removed. Again, the control circuit may generate the 3D graphical representations, may cause one or more graphics processors on the user interface unit to generate the graphical representations, and/or the product and/or package identifier information for the one or more packaged products removed from the delivery vehicle can be communicated to the graphics server 112 to generate and/or modify one or more of the 3D graphical representations that are communicated back to the user interface unit. Typically, modification to the 3D graphical representations includes removing the representations of the one or more products identified as having been removed. The control circuit 402 can cause the updates to the graphical display such that graphical representations of the one or more package products indicated as having been removed are not displayed. As such, the 3D graphical representations continue to be consistent with the actual products remaining in the delivery vehicle.

In some applications, some or all of the 3D graphical representations of the packaged products are generated at the user interface unit. In such applications, the control circuit receives one or more images captured by a camera 412 and/or location information corresponding to the location of the user interface unit, which typically includes location information relative to the delivery vehicle. The control circuit locates, within the one or more images, the one or more reference points 202 on the delivery vehicle 200. An orientation of a camera capturing the image can be determined relative to an orientation of the delivery vehicle. The control circuit may further obtain an identifier of the delivery vehicle and/or a load identifier. The 3D graphical representations can be generated of at least some of the multiple different packaged products as loaded into the identified delivery vehicle and their orientation relative the orientation of the camera relative to the orientation of the delivery vehicle and their orientation relative to each other as they are positioned within the delivery vehicle, which may be based on the tracked loading log of the delivery vehicle.

Further, the product unloading assistance system 100 can provide additional information about the packaged products to workers prior to and/or while unloading products. This can include, for example, but not limited to identifying one or more packaged products, distinguishing one or more packaged products, providing priority information about one or more products and other such information. In some applications, one or more of the 3D graphical representations and/or the representations of one or more packaged products may be displayed as transparent and/or outlined.

Figure 5:
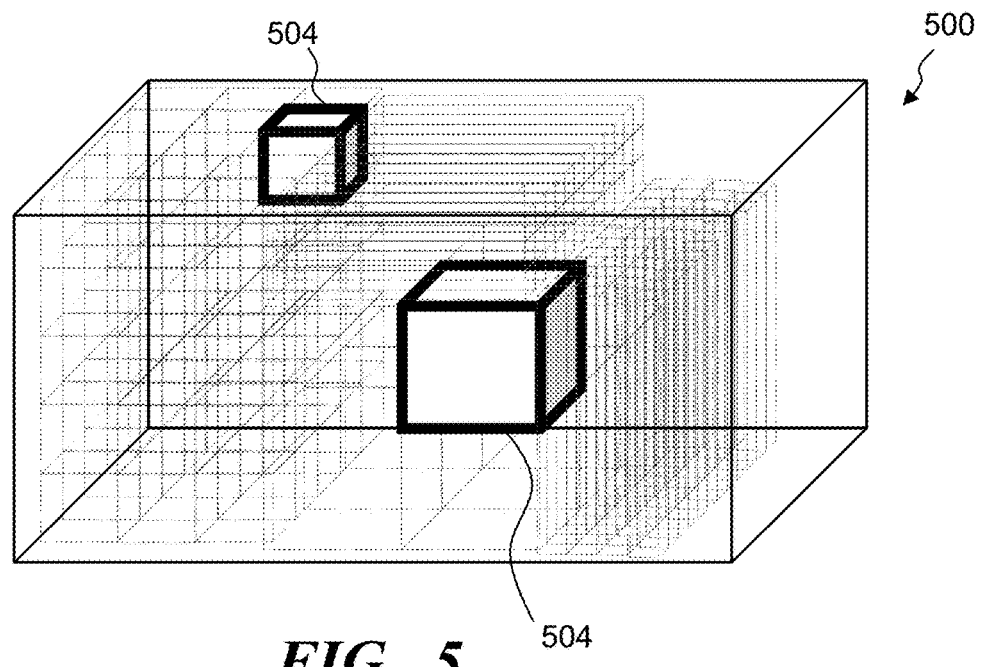
FIG. 5 illustrates a simplified block diagram of an exemplary 3D graphical representation of a load of multiple packaged products in a delivery vehicle, in accordance with some embodiments.

FIG. 5 illustrates a simplified block diagram of an exemplary 3D graphical representation 500 of a load of multiple packaged products 302 in a delivery vehicle 200, in accordance with some embodiments, with at least some of the packaged products are illustrated in an outlined and transparent format. In this representation, the control circuit 402 can cause the graphical display 410 to display 3D outlined and transparent graphical representations of a first set of multiple of the packaged products. As such, the 3D graphical representation allows a worker to view through one or more representations of packaged products, which can further enhance the x-ray effect. Additionally, in some instances, the control circuit can further cause the display to display 3D graphical representations 504 of one or more of the packaged products as non-transparent such that the non-transparent 3D graphical representations 504 of the one or more packaged products are distinguished from the 3D outlined and transparent graphical representations of the first set of the packaged products.

In some embodiments, the graphic representation is presented with representations of one or more packaged products distinguished from other packaged products in response to receiving a request to visually distinguish one or more packages. As such, the control circuit is may receive an identification of one or more packaged products requested to be distinguished from other packaged products in the delivery vehicle. This request may be received from a worker attempting to identify where in the vehicle the one or more particular packaged products are located, in response to the inventory system 104 identifying one or more packaged products as having a higher priority, or other such requests. In response to the request, the control circuit and/or the graphics server can generate one or more 3D graphical representations with one or more of the packaged products highlighted. This highlighting can include displaying the highlighted package in a different color, with thicker lines, flashing, and/or other such highlighting that can help a worker visually identify the one or more packaged products within the graphic representation. Further, just the one or more packages of interest may be displayed, such that they appear floating in space within the delivery vehicle at their determined location within the delivery vehicle. Similarly, one or more of the other packaged products can be displayed in attempts to further enhance the distinction, such as but not limited to displaying one or more other packaged products in dashed lines, thinner lines, in outline form, transparent, and/or other such methods. In some applications, the control circuit causes the graphical display to display the 3D graphical representations displaying non-transparent 3D graphical representations of the identified packaged products graphically located consistent to three dimensional locations within the delivery vehicle, based on a tracked loading log, of the identified one or more packaged products.

As described above, in some implementations, one or more of the 3D graphical representations are received from graphics server 112, which is typically remote from the user interface unit 102. In some embodiments, a wireless transceiver of the I/O interface 406 couples with the control circuit 402 and wirelessly receives from a remote graphics server 112 the 3D graphical representations of the multiple different packaged products as loaded into the delivery vehicle.

Figure 6:
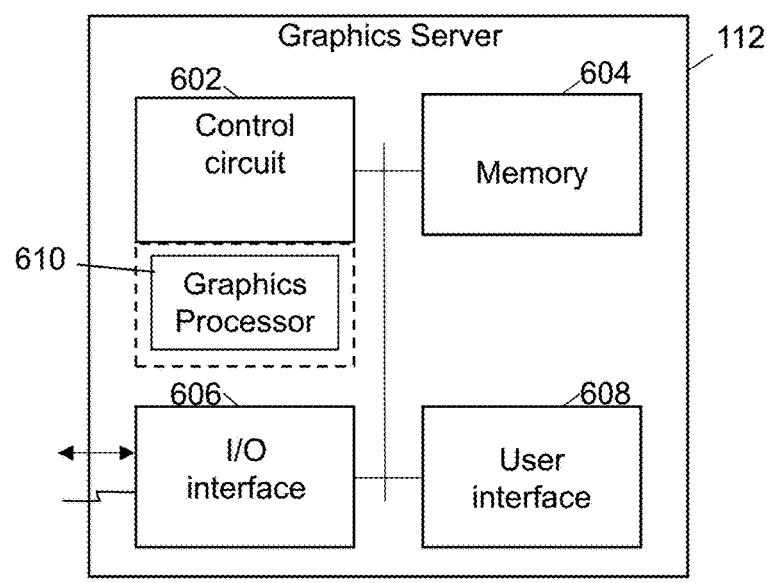
FIG. 6 illustrates a simplified block diagram of an exemplary graphics server, in accordance with some embodiments.

FIG. 6 illustrates a simplified block diagram of an exemplary graphics server 112, in accordance with some embodiments. The graphics server 112 can include one or more control circuits 602, memory 604, and input/output (I/O) interfaces 606. In some implementations, the server further includes a user interface 608.

The server control circuit 602 typically comprises one or more processors and/or microprocessors. In some embodiments, the control circuit 602 may include and/or couple with one or more graphics processors 610 configured to generate 3D graphical representations of the product packages of a load in a delivery vehicle. The memory 604 stores the operational code or set of instructions that is executed by the control circuit 602 and/or processors to implement the functionality of the graphics server 112. In some embodiments, the memory 604 may also store some or all of particular data that may be needed to generate the 3D representations. Such data may be pre-stored in the memory, received from an external source (e.g., user interface unit 102, inventory system 104, load tracker system 110, etc.), be determined, and/or communicated to the graphics server. It is understood that the control circuit 602 and/or graphics processor 610, may be implemented as one or more processor devices as are well known in the art. Similarly, the memory 604 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 604 is shown as internal to the user interface unit 102; however, the memory 604 can be internal, external or a combination of internal and external memory. While FIG. 6 illustrates the various components being coupled together via a bus, it is understood that the various components may actually be coupled to the control circuit 602 and/or one or more other components directly.

The control circuit 602 and/or electronic components of the graphics server can comprise fixed-purpose hard-wired platforms or can comprise a partially or wholly programmable platform. These architectural options are well known and understood in the art and require no further description here. The graphics server and/or control circuit 602 can be configured (for example, by using corresponding programming as will be well understood by those skilled in the art) to carry out one or more of the steps, actions, and/or functions described herein. In some implementations, the control circuit 602 and the memory 604 may be integrated together, such as in a microcontroller, application specification integrated circuit, field programmable gate array or other such device, or may be separate devices coupled together.

The I/O interface 606 allows wired and/or wireless communication coupling of the graphics server to external components, such as the user interface unit 102, inventory system 104, load tracker system 110, database 114, and other such devices or systems. Typically, the I/O interface 606 provides at least wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitter, receiver, transceiver, etc.

The user interface 608 may be used for user input and/or output display. For example, the user interface 608 may include any known input devices, such one or more buttons, knobs, selectors, switches, keys, touch input surfaces, audio input, and/or displays, etc. Additionally, the user interface 608 include one or more output display devices, such as lights, visual indicators, display screens, etc. to convey information to a user, including the 3D graphical representation of the packaged products and their orientation of a load, information, dimensions, product unload priorities, identifier information, temperature requirements, location within an unloading area, back storage area and/or sales floor where a product is to be placed upon unloading, communication information (e.g., text messages, emails, etc.), status information, mapping information, operating status information, notifications, errors, conditions, and/or other such information. Similarly, the user interface 608 in some embodiments may include audio systems that can receive audio commands or requests verbally issued by a worker, and/or output audio content, alerts and the like.

Additionally, in some implementations, the graphics server 112 may receive location and/or movement information of the user interface unit 102. The location and/or movement information can provide relevant information in determining an orientation of the user interface unit and/or the camera relative to the delivery vehicle 200. The location information may be utilized by the graphics server 112 in generating the 3D graphical representations of packaged products and/or displayed within a representation of the delivery vehicle. Additionally or alternatively, the graphics server may receive images and/or video and perform image and/or video processing to determine relative orientation and/or movement of the user interface unit. This image and/or video processing may be used in addition to location and/or movement information provided to the graphics server (e.g., from the user interface unit).

In some embodiments, the control circuit receives, through the transceiver, one or more images of the delivery vehicle 200 as captured by the remote camera 412 of the user interface unit 102. The control circuit locates within the image one or more reference points 202 on the delivery vehicle. Again, the reference points may be part of the delivery vehicle, affixed to the delivery vehicle, or the like. The orientation of the camera capturing the image is determined relative to the orientation of the delivery vehicle. As described above, this can include distance information, determined distances, determined angular relationships based on size and/or orientation of reference points, tracked movements, determined movements, and the like.

The graphics server further obtains the identifier of the load. This can be provided by the user interface unit, the inventory system 104 and/or other source. Based on the identified load, the control circuit and/or graphics processor 610 generates one or more graphical representations illustrating the 3D graphical representations of multiple different packaged products as loaded into the delivery vehicle and their orientation relative to the orientation of the camera relative to the orientation of the delivery vehicle and relative to each other as they are positioned within the delivery vehicle based on the tracked loading log of the delivery vehicle. The one or more 3D graphical representations can then be communicated, through a transceiver, to the remote user interface unit or other such remote graphical display device to be displayed on the graphical display of the user interface unit.

Figure 7:
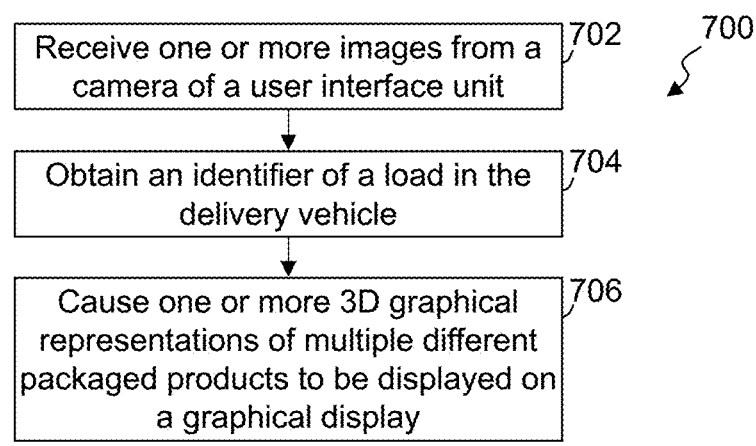
FIG. 7 illustrates a simplified flow diagram of an exemplary process of providing interactive graphical representations of products loaded in a delivery vehicle, in accordance with some embodiments.

FIG. 7 illustrates a simplified flow diagram of an exemplary process 700 of providing interactive graphical representations of products loaded in a delivery vehicle 200, in accordance with some embodiments. In step 702, one or more images are received from a camera 412 coupled with a control circuit of a user interface unit or other such display device. The image includes at least a portion of a product delivery vehicle to be unloaded and further includes one or more reference points on the delivery vehicle that are readily identifiable from the image. In step 704, an identifier is obtained of a load in the delivery vehicle. This identifier may be based on an identifier of the delivery vehicle, a tracked loading log, notification from a distribution center and/or shopping facility, or the like.

In step 706, one or more 3D graphical representations of multiple different packaged products as loaded into the identified delivery vehicle are caused to be displayed on a graphical display in accordance with an orientation of the camera relative to the delivery vehicle based on the one or more reference points. Further, the 3D graphical representations typically also display the orientation of the packaged products relative to each other as they are positioned within the delivery vehicle. Again, some embodiments utilize a tracked loading log that specifies location and/or orientation information of products within the delivery vehicle as they were loaded into the delivery vehicle. As such, in some applications, the 3D graphical representations are based in part on a tracked loading log of the delivery vehicle compiled at least in part during the loading of the multiple different packaged products.

Some embodiments further modify the 3D graphical representations based on movements of a display device. As such, movements of at least the camera of the user interface unit can be tracked relative to delivery vehicle. Updates of the displayed the 3D graphical representations of multiple different packaged products can be caused to be displayed such that the updated displayed 3D graphical representations of the different packaged products continues to be consistent with the orientation of the camera relative to the delivery vehicle as the camera is moved. The 3D graphical representations can similarly be updated and/or maintained based on the unloading and removal of products from the delivery vehicle. Some embodiments receive an identification of one or more packaged products that are indicated as removed from the delivery vehicle. The control circuit can cause the display of updated 3D graphical representations of the multiple different packaged products such that graphical representations of the one or more package products indicated as having been removed are not displayed.

In some embodiments, the control circuit 402 of the user interface unit can cause the graphical display to the 3D graphical representations to display 3D outlined and transparent or partially transparent graphical representations of one or more of the packaged products. Additionally or alternatively, the graphical representations can display 3D graphical representations of one or more of the packaged products as non-transparent and/or highlighted such that the non-transparent 3D graphical representations of the one or more packaged products are distinguished from the 3D outlined and transparent graphical representations of the first set of the packaged products. Further, the non-transparent 3D graphical representations may be visible behind and/or through one or more of the transparently displayed representations, based on a location of the non-transparent product representations relative to the location of the one or more transparent or partially transparent product representations, and their orientation relative to the user interface unit. In some instances, a request is received to visually distinguish one or more packaged products. As such, the control circuit, inventory system and/or graphics server may receive an identification of one or more packaged products requested to be distinguished from other packaged products in the delivery vehicle. Accordingly, the 3D graphical representation can be displayed with the non-transparent 3D graphical representations of the identified packaged products graphically located consistent to three dimensional locations within the delivery vehicle, based on the tracked loading log, of the identified one or more packaged products.

The user interface unit 102 can be configured to generate some or all of the 3D graphical representations. Additionally or alternatively, some or all of the 3D graphical representations may be provided by one or more remote graphics servers 112. Some embodiments are configured to locate within the image the one or more reference points on the delivery vehicle, determine an orientation of a camera capturing the image relative to an orientation of the delivery vehicle. Again, typically, the orientation of the camera relative to the delivery vehicle in part is determined based on the reference points (e.g., sizes, difference in sizes, relative distances in the image between reference points, angles between reference points within the image, and the like). Additionally, some embodiments take into consideration other location information such as, but not limited to, distance measurement information, GPS coordinate information, changes in distance information, changes in relative positioning of reference points, inertial movement information, other such information, and typically a combination of two or more of such parameters and/or information. Some embodiments further obtain an identifier of the delivery vehicle, an identifier of the load, or other such information. The 3D graphical representations can be generated of the multiple different packaged products as loaded into the identified delivery vehicle and their orientation relative the orientation of the camera relative to the orientation of the delivery vehicle and their orientation relative to each other as they are positioned within the delivery vehicle. Again, this orientation is typically further based on the tracked loading log of the delivery vehicle.

Again, some or all of the 3D graphics representations may be received from one or more remote graphics server. In some instances, the 3D graphical representations of the multiple different packaged products as loaded into the delivery vehicle may be wirelessly received from a remote graphics server. The one or more graphic servers are remote from a display device (e.g., the user interface unit 102). The graphics server can receive one or more images and/or video of the delivery vehicle as captured by the camera 412 of the remote user interface unit. The one or more reference points on the delivery vehicle can be located within the one or more images and/or video. An orientation of the camera capturing the image can be determined relative to the orientation of the delivery vehicle. An identifier of the load in the delivery vehicle can be obtained at the graphics server. Based on the identified load, the graphics server can generate one or more graphical representations illustrating the 3D graphical representations of multiple different packaged products as loaded into the delivery vehicle and their orientation relative to the orientation of the camera relative to the orientation of the delivery vehicle and relative to each other as they are positioned within the delivery vehicle based on the tracked loading log of the delivery vehicle. The one or more graphical representations can be communicated, for example through a transceiver, to the user interface unit to be displayed on the graphical display of the user interface unit.

Accordingly, some embodiments allow the use of smart device user interface units (e.g., glasses, smart phones, tablets, smart watch, and the like) and allow workers to direct a camera the delivery vehicle. Established reference points and/or locations of the delivery can be identified and their location can be determined relative to the user interface unit. Three-dimensional models and/or modeling can be utilized to display where products are as the user interface unit is moved around relative to the delivery vehicle. A worker can walk around the delivery vehicle (without opening doors) and see graphical representations displayed on the user interface unit of the products in the delivery vehicle. Further, in some implementations, the assistance system can locate one or more particular products, and the graphical representations of the products can highlight the one or more particular products. In some applications, one or more products to be displayed as outlined and/or transparent allowing the identified and/or highlight products of interest to be more readily identified within the graphical representation and its location and orientation within the delivery vehicle. Workers can effectively see through the transparently displayed products to the see the highlighted products. As such, some embodiments provide a simulated x-ray vision into the delivery vehicle to see where products sit.

In some applications, the 3D graphical representations can be utilized in delivering products to a customer's home, place of business and/or other intended location. For example, with some delivery systems, ordered products are loaded into a delivery vehicle. In some instances, products of an order are placed into one or more boxes, tubs, bins or the like that are placed into the delivery vehicle, often with other tubs of other products for delivery one or more other customers. Additionally, some delivery vehicles may have separate sections, such as one or more cold sections for products to be maintained at a cold temperature (e.g., below 50° F.); one or more frozen sections (e.g., below 27° F.); one or more ambient temperature sections (e.g., uncontrolled temperature); one or more heated sections; bulk item section; and/or other such sections. The 3D graphical representations allows a delivery worker to readily identify locations within the delivery vehicle of one or more products intended for a particular delivery address. Further, the ability to highlight products further simplifies the identification of products. The use of the camera allows the displayed 3D graphic representations to be modified as the delivery worker moves around the vehicle and/or opens one or more doors.

Further, some embodiments may track the movement of one or more products in the delivery vehicle from an original location to a different location within the delivery vehicle. For example, the control circuit and/or inventory system may detect that a product intended for a first customer was not delivered (e.g., customer was not present to receive the delivery). Video and/or images from the camera 412 can be used to track the change in location of the one or more products, bins or the like to a second location. This modified location information can be tracked and used to update the packaged product location information and thus modify the 3D graphical representations of the packaged products.

As another example, the delivery vehicle may be delivering a load to a shopping facility. As such, one or more workers can use one or more user interface units to virtually view products within the delivery vehicle without even having to open the doors of the delivery vehicle and/or without inspecting the interior of the delivery vehicle. Further, as products are unloaded the system can track products that are removed. Once removed, those products can be removed from subsequent 3D graphical representations so that workers only see the simulated view of the products remaining on the delivery vehicle. Again, a worker may request that one or more products be identified. For example, one or more products may be flagged as having higher priorities. As such, these products when displayed in the 3D graphical representation may be distinguished from other displayed products in the delivery vehicle, allowing customer to more easily identify those priority products.

In some embodiments, systems, apparatuses and methods are provided to enhance and/or assist in the unloading of products from a delivery vehicle. Some embodiments, provide product unloading assistance systems, comprising: a control circuit; a graphical display communicationally coupled with the control circuit and configured to display three-dimensional (3D) graphical representations; a camera communicationally coupled with the control circuit; and a memory coupled to the control circuit and storing computer instructions that when executed by the control circuit cause the control circuit to perform the steps of: receive an image from the camera comprising at least a portion of a product delivery vehicle to be unloaded and one or more reference points on the delivery vehicle, wherein the one or more reference points are readily identifiable from the image; obtain an identifier of a load in the delivery vehicle to be unloaded; and cause the graphical display to display, in accordance with an orientation of the camera relative to the delivery vehicle based on the one or more reference points, 3D graphical representations of multiple different packaged products as loaded into the delivery vehicle and their orientation relative to each other as they are positioned within the delivery vehicle.

Further, some embodiments provide methods of assisting in unloading a delivery vehicle, comprising: by a control circuit; receiving an image from a camera coupled with the control circuit, wherein the image comprises at least a portion of a product delivery vehicle to be unloaded and one or more reference points on the delivery vehicle that are readily identifiable from the image; obtaining an identifier of a load in the delivery vehicle to be unloaded; and causing a graphical display to display, in accordance with an orientation of the camera relative to the delivery vehicle based on the one or more reference points, 3D graphical representations of multiple different packaged products as loaded into the identified delivery vehicle and their orientation relative to each other as they are positioned within the delivery vehicle.

Still further, some embodiments provide product unloading assistance systems, comprising: a transceiver; a control circuit; a memory coupled to the control circuit and storing computer instructions that when executed by the control circuit cause the control circuit to perform the steps of: receive one or more images of a delivery vehicle as captured by a camera of a remote graphical display device; determine an orientation of the camera capturing the image relative to an orientation of the delivery vehicle; obtain an identifier of a load in the delivery vehicle to be unloaded; generate, based on the identified load, one or more graphical representations illustrating 3D graphical representations of multiple different packaged products as loaded into the delivery vehicle and their orientation relative to the orientation of the camera relative to the delivery vehicle and relative to the positioning of the other packaged products within the delivery vehicle; and communicating, through the transceiver and to the display device, the one or more graphical representations to be displayed by the display device.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A product unloading assistance system, comprising:
    a control circuit;
    a graphical display communicationally coupled with the control circuit and configured to display three-dimensional (3D) graphical representations;
    a camera communicationally coupled with the control circuit; and
    a memory coupled to the control circuit and storing computer instructions that when executed by the control circuit cause the control circuit to perform the steps of:
    receive an image from the camera comprising at least a portion of a product delivery vehicle to be unloaded and one or more reference points on the delivery vehicle, wherein the one or more reference points are readily identifiable from the image;
    locate within the image the one or more reference points on the delivery vehicle;
    obtain an identifier of a load in the delivery vehicle to be unloaded;
    obtain an orientation of the camera capturing the image relative to the delivery vehicle;
    generate, based on the identified load, one or more graphical representations illustrating 3D graphical representations of multiple different packaged products as loaded into the delivery vehicle and their orientation relative to the orientation of the camera relative to the delivery vehicle, and relative to each other as the packaged products are positioned within the delivery vehicle based on a tracked loading log of the delivery vehicle; and
    cause the graphical display to display, in accordance with the orientation of the camera relative to the delivery vehicle based on the one or more reference points, the 3D graphical representations of the multiple different packaged products as loaded into the delivery vehicle and their orientation relative to each other as they are positioned within the delivery vehicle.

2. The system of claim 1, wherein the control circuit is further configured to cause the graphical display to display 3D outlined and transparent graphical representations of a first set of multiple of the packaged products and to display 3D graphical representations of one or more other of the packaged products as non-transparent such that the non-transparent 3D graphical representations of the one or more other packaged products are distinguished from the 3D outlined and transparent graphical representations of the first set of the packaged products.

3. The system of claim 2, wherein the control circuit is further configured to receive an identification of the one or more other packaged products requested to be distinguished from other packaged products in the delivery vehicle; and wherein the control circuit in causing the graphical display to display the 3D graphical representations further causes the displaying of the non-transparent 3D graphical representations of the identified one or more other packaged products graphically located consistent to three dimensional locations within the delivery vehicle, based on a tracked loading log, of the identified one or more packaged products.

4. The system of claim 1, wherein the control circuit is further configured to:
    track movements of at least the camera relative to delivery vehicle; and
    cause updates of the displaying of the 3D graphical representations of multiple different packaged products such that the updated displayed 3D graphical representations of the different packaged products continue to be consistent with the orientation of the camera relative to the delivery vehicle as the camera is moved.

5. The system of claim 1, wherein the control circuit is further configured to receive an identification of one or more packaged products that are indicated as removed from the delivery vehicle, wherein the control circuit in causing the display of the 3D graphical representations of the multiple different packaged products updates the graphical display such that graphical representations of the one or more package products indicated as having been removed are not displayed.

6. The system of claim 1, comprising:
    a portable user interface unit comprising a portable user interface control circuit coupled with the camera, the graphical display and a wireless transceiver providing wireless communication between the portable user interface control circuit and the control circuit, wherein the transceiver wirelessly receives the 3D graphical representations of the multiple different packaged products as loaded into the delivery vehicle.

7. The system of claim 1, further comprising:
    a graphics server comprising the control circuit configured to:
    communicate, through the transceiver, the one or more graphical representations to a remote display device to be displayed on the graphical display of the display device.

8. The system of claim 1, wherein the control circuit is further configured to:
    determine the orientation of the camera capturing the image relative to the orientation of the delivery vehicle based on sensor data;
    obtain an identifier of the delivery vehicle; and
    obtain the tracked loading log of the delivery vehicle.

9. A method of assisting in unloading a delivery vehicle, comprising:
    by a control circuit;
    receiving an image from a camera, wherein the image comprises at least a portion of a product delivery vehicle to be unloaded and one or more reference points on the delivery vehicle that are readily identifiable from the image;
    locating within the image the one or more reference points on the delivery vehicle;
    obtaining an identifier of a load in the delivery vehicle to be unloaded;
    obtaining an orientation of the camera capturing the image relative to the delivery vehicle;
    generating, based on the identified load, one or more graphical representations illustrating 3D graphical representations of multiple different packaged products as loaded into the delivery vehicle and their orientation relative to the orientation of the camera relative to the delivery vehicle, and relative to each other as the packaged products are positioned within the delivery vehicle based on a tracked loading log of the delivery vehicle; and causing a graphical display to display, in accordance with the orientation of the camera relative to the delivery vehicle based on the one or more reference points, the 3D graphical representations of the multiple different packaged products as loaded into the identified delivery vehicle and their orientation relative to each other as they are positioned within the delivery vehicle.

10. The method of claim 9, wherein the causing the graphical display to the 3D graphical representations comprises causing the display of 3D outlined and transparent graphical representations of a first set of multiple of the packaged products and to display 3D graphical representations of one or more other of the packaged products as non-transparent such that the non-transparent 3D graphical representations of the one or more other packaged products are distinguished from the 3D outlined and transparent graphical representations of the first set of the packaged products.

11. The method of claim 10, further comprising:
receiving an identification of the one or more other packaged products requested to be distinguished from other packaged products in the delivery vehicle; and
wherein the causing the display of the 3D graphical representations further comprises causing the displaying of the non-transparent 3D graphical representations of the identified one or more other packaged products graphically located consistent to three dimensional locations within the delivery vehicle, based on a tracked loading log, of the identified one or more other packaged products.

12. The method of claim 9, further comprising:
tracking movements of at least the camera relative to delivery vehicle; and
causing updates of the displaying of the 3D graphical representations of multiple different packaged products such that the updated displayed 3D graphical representations of the different packaged products continue to be consistent with the orientation of the camera relative to the delivery vehicle as the camera is moved.

13. The method of claim 9, further comprising:
receiving an identification of one or more packaged products that are indicated as removed from the delivery vehicle; and
causing the display of updated 3D graphical representations of the multiple different packaged products such that graphical representations of the one or more package products indicated as having been removed are not displayed.

14. The method of claim 9, further comprising:
wirelessly receiving, from a remote graphics server, the 3D graphical representations of the multiple different packaged products as loaded into the delivery vehicle at a portable user interface unit and displaying the 3D graphical representations of the multiple different packaged products on the graphical display of the portable user interface unit.

15. The method of claim 9, further comprising:
by a graphics server that comprises the control circuit and that is remote from a display device:
communicating, through a transceiver and to the display device, the one or more graphical representations to be displayed on the graphical display of the display device.

16. The method of claim 9, further comprising:
determining the orientation of the camera capturing the image relative to the orientation of the delivery vehicle;
obtaining an identifier of the delivery vehicle; and
orientation relative to each other as they are positioned within the delivery vehicle obtaining the tracked loading log of the delivery vehicle.

17. A product unloading assistance system, comprising:
a transceiver;
a control circuit;
a memory coupled to the control circuit and storing computer instructions that when executed by the control circuit cause the control circuit to perform the steps of:
receive one or more images of a delivery vehicle as captured by a camera of a remote graphical display device, wherein each of the one or more images includes at least a portion of the delivery vehicle and one or more reference points on the delivery vehicle, wherein the one or more reference points are readily identifiable from the image;
locate within at least one of the one or more images the one or more reference points on the delivery vehicle;
determine an orientation of the camera capturing the image relative to an orientation of the delivery vehicle;
obtain an identifier of a load in the delivery vehicle to be unloaded;
generate, based on the identified load, one or more graphical representations illustrating 3D graphical representations of multiple different packaged products as loaded into the delivery vehicle and their orientation relative to the orientation of the camera relative to the delivery vehicle and relative to the positioning of the other packaged products within the delivery vehicle; and
communicating, through the transceiver and to the display device, the one or more graphical representations to be displayed by the display device.

18. The system of claim 1, comprising a portable user interface unit comprising the control circuit, the camera and the graphical display.

19. The system of claim 1, wherein the server control circuit is further configured to:
detect, from the image, the one or more reference points; and
obtain, based on the one or more reference points detected in the image, an identifier of the delivery vehicle;
wherein the obtaining the identifier of the load comprises identifying the identifier of the load as a function of the identifier of the delivery vehicle to be unloaded.

* * * * *

UNITED STATES PATENT AND TRADEMARK OFFICE
CERTIFICATE OF CORRECTION

PATENT NO. : 10,360,528 B2
APPLICATION NO. : 15/342716
DATED : July 23, 2019
INVENTOR(S) : Donald R. High et al.

It is certified that error appears in the above-identified patent and that said Letters Patent is hereby corrected as shown below:

In the Claims

Column 22, Lines 14-15, Claim 16, delete "orientation relative to each other as they are positioned within the delivery vehicle" after "and".
Column 22, Line 51, Claim 19, delete "server" after "the".

Signed and Sealed this
Twenty-fourth Day of December, 2019

Andrei Iancu
*Director of the United States Patent and Trademark Office*